(12) United States Patent
Ming et al.

(10) Patent No.: US 8,471,936 B2
(45) Date of Patent: Jun. 25, 2013

(54) IMAGING DEVICE AND SIGNAL PROCESSING METHOD

(75) Inventors: Li Ming, Kanagawa (JP); Ryota Kosakai, Tokyo (JP); Akira Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 12/303,797

(22) PCT Filed: Jun. 1, 2007

(86) PCT No.: PCT/JP2007/061177
§ 371 (c)(1),
(2), (4) Date: Dec. 31, 2009

(87) PCT Pub. No.: WO2007/145087
PCT Pub. Date: Dec. 21, 2007

(65) Prior Publication Data
US 2010/0231745 A1    Sep. 16, 2010

(30) Foreign Application Priority Data

Jun. 16, 2006 (JP) ................................. 2006-167885

(51) Int. Cl.
*H04N 9/09* (2006.01)
*H04N 9/83* (2006.01)
*H04N 3/14* (2006.01)
*H04N 5/335* (2011.01)
*H04N 9/04* (2006.01)

(52) U.S. Cl.
USPC ........... 348/265; 348/275; 348/276; 348/279; 348/280

(58) Field of Classification Search
USPC .......................................................... 348/265
See application file for complete search history.

(56) References Cited

U.S. PATENT DOCUMENTS 4,106,056 A * 8/1978 Nagumo et al. .............. 348/265
5,237,185 A    8/1993 Udagawa et al.
(Continued)

FOREIGN PATENT DOCUMENTS

EP    0 632 663 A2    1/1995
JP    59-154889    9/1984
(Continued)

OTHER PUBLICATIONS

Munich Office Action in corresponding European Patent Application 07 74 4565 dated Nov. 12, 2009 (7 pages).

(Continued)

*Primary Examiner* — Sinh Tran
*Assistant Examiner* — Jason Flohre
(74) *Attorney, Agent, or Firm* — Finnegan, Henderson, Farabow, Garrett & Dunner, LLP

(57) ABSTRACT

The present invention provides an imaging device that generates, for each of a red color, a green color, and a blue color, an image signal having pixels arranged adjacent to each other in a two-dimensional array, including a red color imaging element that senses incident light to output a red color signal (20R) having pixels arranged in a check pattern, a green color imaging element that senses the incident light to output a green color signal (20G) having pixels arranged in a check pattern, a blue color imaging element that senses the incident light to output a blue color signal (20B) having pixels arranged in a check pattern, interpolation means for interpolating a blank pixel using neighboring pixels, and correlation means for determining a correlation of the neighboring pixels of the blank pixel, wherein the correlation means determines a correlation for each of the red color signal, the green color signal, and the blue color signal on the basis of at least one color signal of the red color signal, the green color signal, and the blue color signal, and wherein the interpolation means interpolates the blank pixel for each of the red color signal, the green color signal, and the blue color signal on the basis of the correlation to generate an imaging signal.

11 Claims, 13 Drawing Sheets

U.S. PATENT DOCUMENTS

| | | | |
|---|---|---|---|
| 5,414,465 A * | 5/1995 | Kodama et al. | 348/236 |
| 5,526,048 A * | 6/1996 | Yamamoto | 348/265 |
| 5,657,082 A * | 8/1997 | Harada et al. | 348/264 |
| 6,295,087 B1 | 9/2001 | Noda | |
| 6,522,356 B1 * | 2/2003 | Watanabe | 348/272 |
| 6,570,616 B1 * | 5/2003 | Chen | 348/272 |
| 6,724,932 B1 * | 4/2004 | Ito | 382/162 |
| 6,882,364 B1 * | 4/2005 | Inuiya et al. | 348/252 |
| 2001/0024237 A1 * | 9/2001 | Osada et al. | 348/273 |
| 2002/0085103 A1 * | 7/2002 | Kondo et al. | 348/273 |
| 2008/0043115 A1 * | 2/2008 | Tsukioka | 348/222.1 |
| 2009/0109296 A1 * | 4/2009 | Kuno et al. | 348/222.1 |

FOREIGN PATENT DOCUMENTS

| | | |
|---|---|---|
| JP | 4-58682 | 2/1992 |
| JP | 4-320372 | 11/1992 |
| JP | 10-150668 | 6/1998 |
| JP | 11-76159 | 3/1999 |
| JP | 2000-184386 | 6/2000 |
| JP | 2005-175893 | 6/2005 |
| WO | WO 2005112470 A1 * | 11/2005 |
| WO | WO 2006059409 A1 * | 6/2006 |

OTHER PUBLICATIONS

Gunturk, et al., "Demosaicking: Color Filter Array Interpolation", IEEE Signal Processing Magazine, pp. 44-54, (Jan. 2005).

* cited by examiner

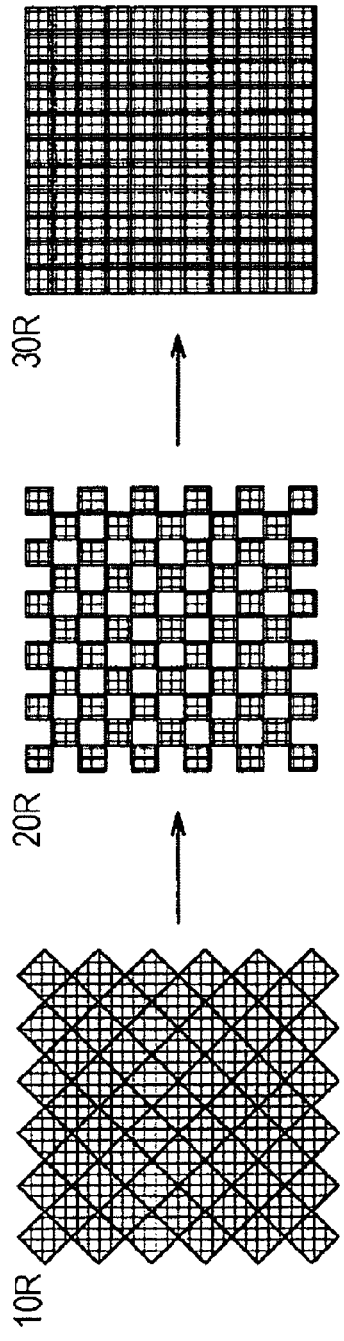

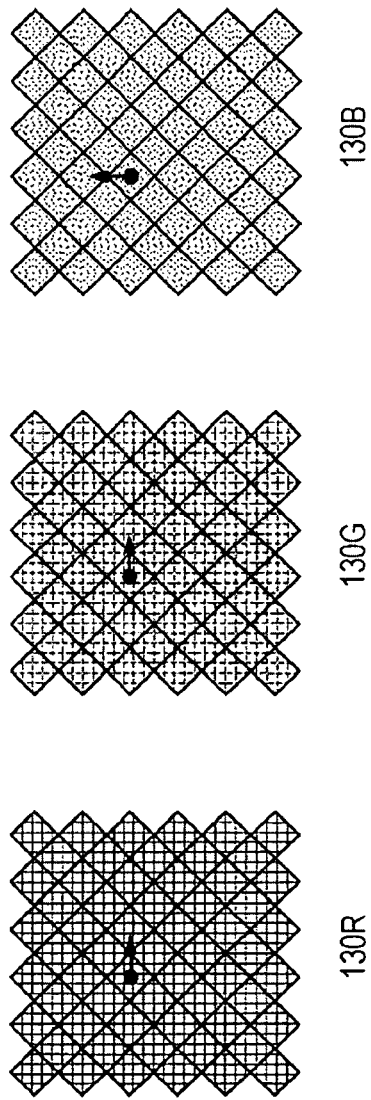

FIG. 13A
FIG. 13B
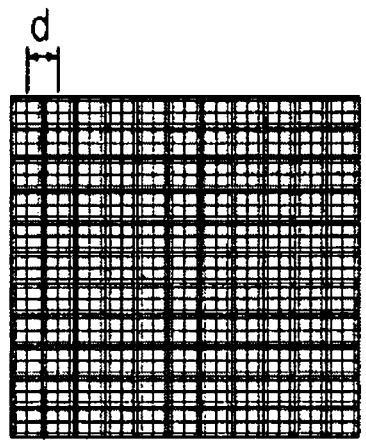
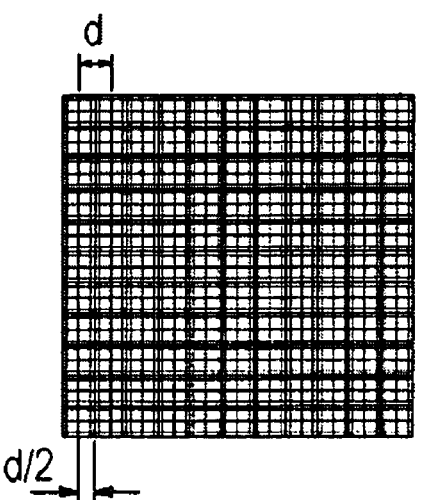
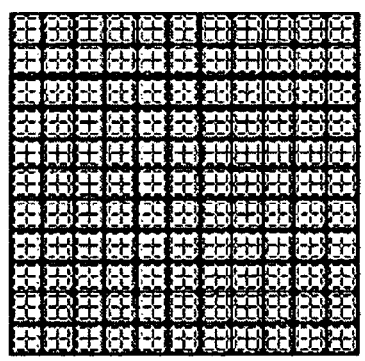
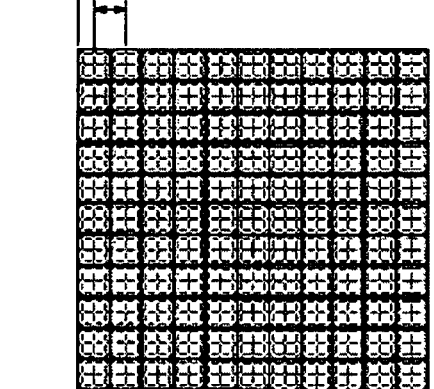
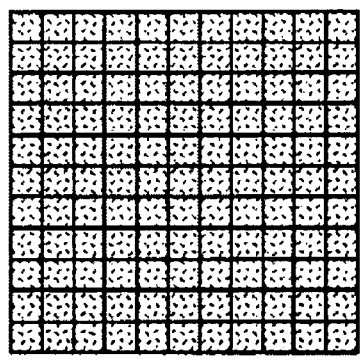
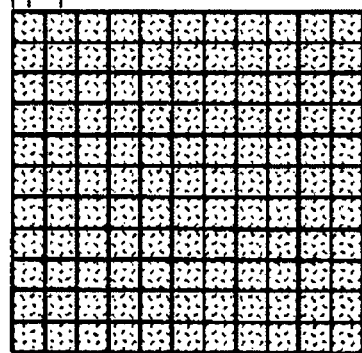

IMAGING DEVICE AND SIGNAL PROCESSING METHOD

TECHNICAL FIELD

The present invention relates to an imaging device and a signal processing method in which imaging signals of three primary colors composed of red color, green color, and blue color are generated.

The present application claims priority based on Japanese Patent Application No. 2006-167885 filed in Japan on Jun. 16, 2006, and this application is incorporated herein by reference.

BACKGROUND ART

In digital cameras, the structure of imaging processing systems that capture a subject as an image mainly has single-chip and three-chip types. Single-chip cameras include one solid-state imaging element, and this one-chip solid-state imaging element is used to generate color signals of three primary colors RGB. For example, Japanese Unexamined Patent Application Publication No. 10-150668 describes an imaging device in which color filters that respectively allow red color, green color, and blue color to pass therethrough are arranged on a one-chip CCD image sensor in a check pattern to generate color signals R, G, and B and in which an image signal with an enhanced resolution is generated using a correlation process and an interpolation process. There is a problem in that a false color occurs in such an image signal with an enhanced resolution.

Three-chip cameras, on the other hand, include three solid-state imaging elements, and red color light, green color light, and blue color light separated by a spectroscopic mirror are individually incident on the three solid-state imaging elements. Those solid-state imaging elements independently generate color signals of red color, green color, and blue color, respectively. The three-chip cameras independently sense light of the three primary colors using the solid-state imaging elements, and yield more reproducible images with higher resolution than those of single-chip cameras. However, due to the increased circuit size and also increased amount of image processing, a longer time is required to read color signals from the solid-state imaging elements.

Further, in the three-chip cameras, there are a square pixel alignment process and a square pixel shift process as processes of generating an image signal from color signals of red color, green color, and blue color obtained from the individual solid-state imaging elements.

The square pixel alignment process is a process of, as shown in FIG. 13A, spatially matching positions of pixels in individual color signals obtained from individual solid-state imaging elements. That is, in the square pixel alignment process, the number of pixels read by a photosensitive sensor is equal to the number of pixels of an image signal on the output side. Thus, in order to increase the resolution of an image signal in this process, it needs to be increased by a magnification similar to that of the number of pixels on the photosensitive sensor side. For example, in a case where the resolution of a still image on the output side is to be increased from 3 Mpixel to 6 Mpixel, the number of pixels on the photosensitive sensor side should also be increased from 3 Mpixel to 6 Mpixel.

Further, in the square pixel shift process, as shown in FIG. 13B, pixel arrays of color signals of red color and blue color are individually shifted horizontally by d/2, which is half pixel size d, with respect to a pixel array of a color signal of green color, and the color signals of the shifted pixels are interpolated to obtain an imaging signal with an enhanced resolution. In this method, the number of pixels of an imaging signal on the output side becomes twice the number of pixels of the individual solid-state imaging elements. In other words, the number of pixels of the solid-state imaging elements is half the number of pixels of an image signal on the output side.

Here, as the resolution per frame increases, the time required to read a color signal from a solid-state imaging element increases. Furthermore, there are hardware constraints to increasing such a color signal reading speed. Therefore, in a case where an image signal with a similar resolution is to be obtained, the square pixel shift process allows an image signal having substantially the same resolution as that of the square pixel alignment process to be generated using the interpolation process even though the number of pixels of a solid-state imaging element is half, thus achieving substantially the same frame rate even if the reading speed is low.

DISCLOSURE OF INVENTION

Technical Problem

Meanwhile, in the three-chip cameras, in a case where an image signal is to be output using the square pixel shift process, a false color occurs in an image subjected to the interpolation process. Thus, the reproducibility of a generated image is impaired compared with that in the case of square pixel alignment.

The present invention has been proposed in view of such a situation, and has a technical object to provide an imaging device and an image signal processing method in which a high-quality image is generated at a high frame rate.

An embodiment of the present invention proposed in order to solve the technical object as described above provides an imaging device that senses light incident through an opening portion to generate, for each of a red color, a green color, and a blue color, an image signal having pixels arranged adjacent to each other in a two-dimensional array, including a red color imaging element that senses the incident light to output a red color signal having pixels arranged in a check pattern, a green color imaging element that senses the incident light to output a green color signal having pixels arranged in a check pattern, a blue color imaging element that senses the incident light to output a blue color signal having pixels arranged in a check pattern, interpolation processing means for interpolating blank pixels between the pixels arranged in the check patterns using pixels neighboring the blank pixels, and correlation processing means for determining correlations among the pixels neighboring the blank pixels. The red color imaging element, the green color imaging element, and the blue color imaging element output the red color signal, the green color signal, and the blue color signal, respectively, in which positions of the individual pixels spatially match each other; the correlation processing means determines the correlations for each of the red color signal, the green color signal, and the blue color signal on the basis of at least one type of color signal from among the red color signal, the green color signal, and the blue color signal; and the interpolation means interpolates pixels of the blank pixels for each of the red color signal, the green color signal, and the blue color signal on the basis of the correlations to generate the image signal.

Further, another embodiment of the present invention provides a signal processing method of generating, for each of a red color, a green color, and a blue color, an image signal having pixels arranged adjacent to each other in a two-dimensional array, including outputting, using three imaging elements, a red color signal having pixels arranged in a check pattern, a green color signal having pixels arranged in a check pattern, and a blue color signal having pixels arranged in a check pattern so that positions of the individual pixels spatially match each other; determining, for each of the red color signal, the green color signal, and the blue color signal, a correlation among pixels neighboring each of blank pixels between the individual pixels arranged in the check pattern on the basis of at least one color signal of the red color signal, the green color signal, and the blue color signal; and interpolating the blank pixels for each of the red color signal, the green color signal, and the blue color signal on the basis of the correlations to generate the imaging signal.

The present invention is intended to determine, for each of a red color signal, a green color signal, and a blue color signal, each having pixels arranged in a check pattern, a correlation among pixels neighboring a blank pixel according to at least one color signal of the red color signal, the green color signal, and the blue color signal, and to interpolate the blank pixel according to the correlation. Thus, a color signal having a higher resolution than the number of pixels read from imaging elements and having no false color is output, whereby an imaging signal having a high resolution can be generated at a high frame rate without reproducibility being impaired.

Still other technical objects of the present invention and specific advantages obtained by the present invention will become more apparent from the embodiment described below with reference to the drawings.

BRIEF DESCRIPTION OF DRAWINGS

FIGS. 3A, 3B, and 3C are block diagrams showing a process of converting imaged red color light, green color light, and blue color light.

FIG. 12 is a diagram showing the nature of noise applied to pixels at the same coordinates in individual imaging elements.

FIGS. 13A and 13B are diagrams showing a color signal generating step of the related art for each of three primary colors.

BEST MODE FOR CARRYING OUT THE INVENTION

A best mode for carrying out the present invention will be described in detail hereinafter with reference to the drawings. The following embodiment is such that the present invention is applied to an imaging device (hereinafter referred to as a digital camera) that senses light incident through an opening portion to generate, for each of a red color, a green color, and a blue color, an imaging signal having pixels arranged adjacent to each other in a two-dimensional array.

Figure 1:
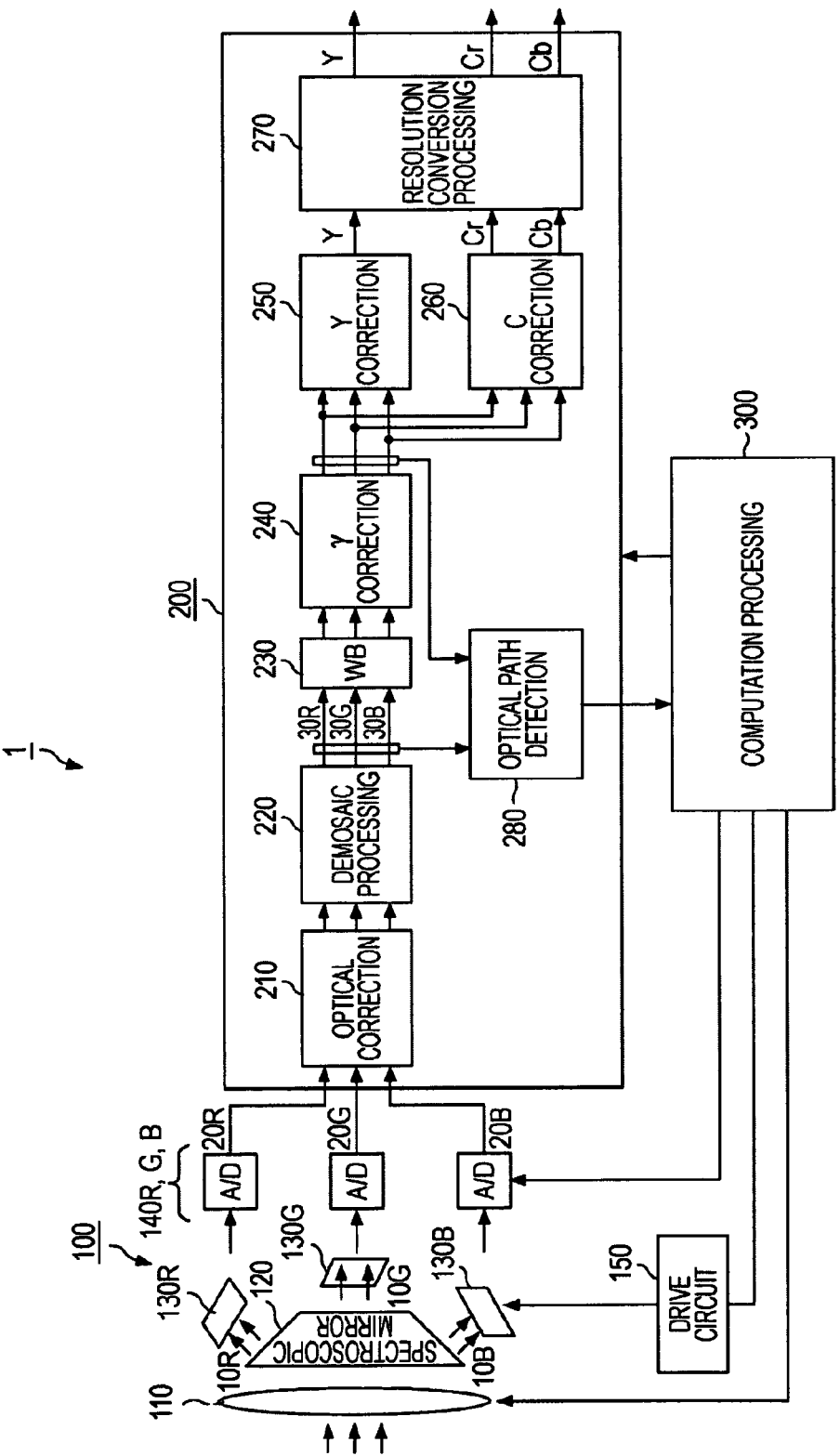
FIG. 1 is a block diagram showing an overall structure of a digital camera.

As shown in FIG. 1, a digital camera 1 according to the present embodiment includes an imaging processing unit 100 that captures an image of a subject to output color signals 20R, 20G, and 20B having three primary colors, i.e., a red color, a green color, and a blue color, a signal processing unit 200 that applies predetermined signal processing to the color signals 20R, 20G, and 20B output from the imaging processing unit 100, and a computation processing unit 300 that controls the imaging processing unit 100 and the signal processing unit 200.

The imaging processing unit 100 is a three-chip imaging processing system, and includes an optical element 110 that focuses light from the subject through an opening portion not shown in figures, a spectroscopic mirror 120 that separates the light focused by the optical element 110 into red color light 10R, green color light 10G, and blue color light 108, three imaging elements 130R, 130G, and 130B that sense the red color light 10R, green color light 10G, and blue color light 10B separated by the spectroscopic mirror 120, respectively, to convert them into electrical signals, A/D conversion units 140R, 140G, and 140B that adjust the gain of the three electrical signals converted by the imaging elements 130R, 130G, and 130B to output digitized color signals 20R, 20G, and 203, and a drive circuit 150 that controls the operation of the imaging elements 130R, 130G, and 130B in response to a control signal from the computation processing unit 300.

The signal processing unit 200 includes an optical correction unit 210 that performs optical correction such as brightness correction or black level correction on the color signals 20R, 20G, and 20B output from the imaging processing unit 100, a demosaic processing unit 220 that applies an interpolation process to the optically corrected color signals 20R, 20G, and 20B to output color signals 30R, 30G, and 30B, a white balance (WB) adjustment unit 230 that adjusts the white balance of the color signals 30R, 30G, and 30B, a γ correction unit 240 that performs γ correction on the white-balance-adjusted color signals 30R, 30G, and 30B, a Y correction unit 250 and C correction unit 260 that output a luminance signal. Y and color difference signals Cr and Cb, respectively, according to the γ-corrected color signals 30R, 30G, and 30B, a resolution conversion processing unit 270 that converts the resolution of the luminance signal Y and the color difference signals Cr and Cb to output a video signal complying with a predetermined broadcasting standard, and an optical path difference detection unit 280 that integrates the color signals 30R, 30G, and 30B individually output from the demosaic processing unit 220 and the γ correction unit 240 to detect an optical path difference between the individual color signals.

The computation processing unit 300 supplies a control signal to the individual processing units of the imaging processing unit 100 and the signal processing unit 200 on the basis of optical path difference information detected by the optical path difference detection unit 280. Specifically, the computation processing unit 300 adjusts the amount of light that passes from the optical element 110 to the spectroscopic mirror 120 on the basis of the optical path difference information, and further controls the operation of the imaging elements 130R, 130G, and 130B through the drive circuit 150 and also controls the signal gain adjusted by the A/D conversion units 140R, 140G, and 140B.

Next, the structure of the imaging elements 130R, 130G, and 130B in the imaging processing unit 100 will be described in detail with reference to FIG. 2.

Each of the imaging elements 130R, 130G, and 130B has a plurality of photosensitive elements disposed on a substrate thereof. In the imaging elements 130R, 130G, and 130B, the individual photosensitive elements sense the red color light 10R, the green color light 10G, and the blue color light 10B to convert them into electrical signals, and the converted electrical signals are output to the A/D conversion units 140R, 140G, and 140B. Here, individual pixel values constituting the color signals 20R, 20G, and 20B correspond to electrical signals output from the photosensitive elements disposed on the substrates of the imaging elements 130R, 130G, and 130B. That is, the number of pixels of each of the color signals 20R, 20G, and 20B corresponds to the number of photosensitive elements provided in a corresponding one of the solid-state imaging elements.

Figure 2B:
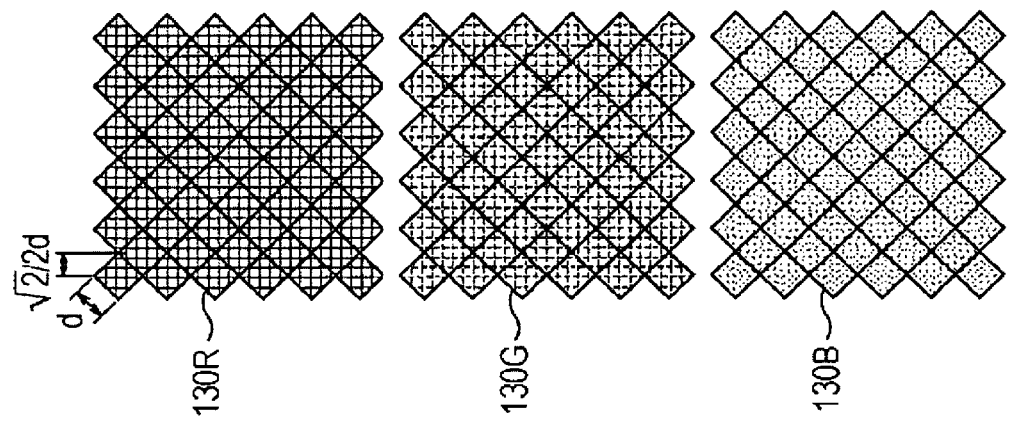
FIGS. 2A and 2B are diagrams showing structures of imaging elements.
Figure 2A:
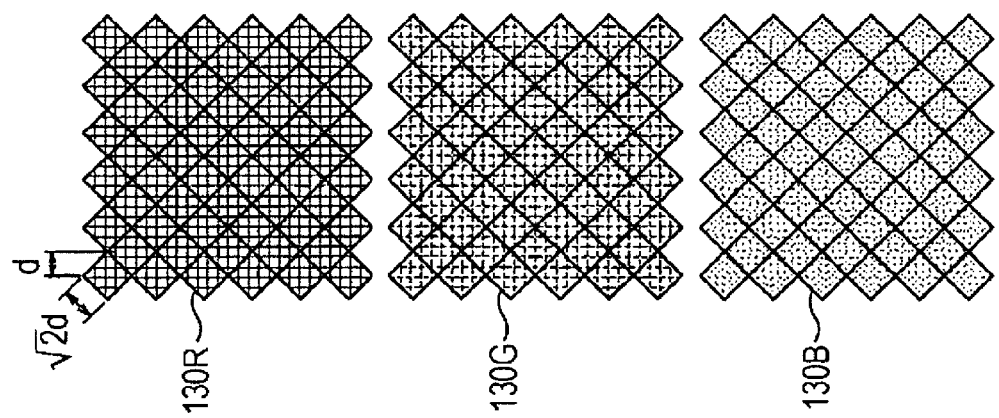

Further, unlike imaging elements of the related art configured such that a plurality of photosensitive elements are disposed in a shape of square lattice having sides each having a length d, the imaging elements 130R, 130G, and 130B are designed such that, as shown in FIG. 2A, the photosensitive elements are disposed in a two-dimensional array in which the square lattice described above, where each side has a length of $(2^{1/2}) \times d$, is rotated by 45°. Thus, the imaging elements 130R, 130G, and 130B have a pitch of d between individual photosensitive elements as in the imaging elements of the related art described above while having a photosensitive element area per pixel twice that of the imaging elements of the related art described above, and achieve high photosensitive characteristics.

Alternatively, instead of the structure shown in FIG. 2A described above, the imaging elements 130R, 130G, and 130B can be configured such that photosensitive elements are disposed in a manner shown in FIG. 2B. Specifically, the imaging elements 130R, 130G, and 130B are designed such that the photosensitive elements are disposed in a two-dimensional array in which the square lattice described above is rotated by 45° without changing the length d of each side of the square lattice. Such imaging elements 130R, 130G, and 130B, when compared with the imaging elements of the related art described above, have the same photosensitive element area to provide an equivalent photosensitive characteristic but have a pitch of $(2^{1/2}) \times d/2$ between the individual photosensitive elements to achieve a $2^{1/2}$ times increase in resolution in each of the horizontal and vertical directions.

Furthermore, in the imaging elements 130R, 130G, and 130B in which the photosensitive elements are disposed in the manner shown in FIGS. 2A and 2B, in both cases, the number of data items to be read is reduced to half that in the imaging elements of the related art. Therefore, given that images of similar frame rates are to be captured, in the imaging elements 130R, 130G, and 130B, the amount of data to be read from the photosensitive elements per given period of time becomes half that in the imaging elements of the related art.

Note that the imaging elements 130R, 130G, and 130B may not necessarily be configured such that photosensitive elements are arranged in the square lattice described above and may be configured such that photosensitive elements are arranged in a two-dimensional array in which an equilateral polygonal lattice such as a rhombic or equilateral hexagonal lattice is rotated by 45°.

Furthermore, the imaging elements 130R, 130G, and 130B may have any structure as long as the color signals 20R, 20G, and 20B having pixels arranged in a check pattern are output, and the structure thereof is not limited to a CCD structure or CMOS structure.

Next, the course of a process that continues until the imaging processing unit 100 generates the color signals 20R, 20G, and 20B from the red color light 10R, the green color light 10G, and the blue color light 10B and the signal processing unit 200 generates the color signals 30R, 30G, and 30B from the color signals 20R, 20G, and 20B will be described.

First, the red color light 10R, green color light 10G, and blue color light 10B separated by the spectroscopic mirror are sensed by photosensitive elements shown in FIG. 3A, which are individually provided in the imaging elements 130R, 130G, and 130B, and are converted into electrical signals. The red color light 10R, green color light 10G, and blue color light 10B converted into electrical signals are processed by the A/D conversion units 140R, 140G, and 140B, respectively, to generate color signals 20R, 20G, and 20B shown in FIG. 3B.

Here, the color signals 20R, 20G, and 20B are signals having individual pixels arranged in a check pattern because, as described above, in the imaging elements 130R, 130G, and 130B, the number of photosensitive elements per given area is reduced to half that in imaging elements of the related art. Thus, in the color signals 20R, 20G, and 20B having pixels arranged in a check pattern, no pixels exist in regions between the individual pixels. The demosaic processing unit 220 interpolates such blank pixels from information of neighboring pixels to generate color signals 30R, 30G, and 30B shown in FIG. 3C.

Next, a blank pixel interpolation method in the present embodiment will be shown hereinbelow, followed by the structure and operation of the demosaic processing unit 220 that implements the interpolation method.

Figure 4:
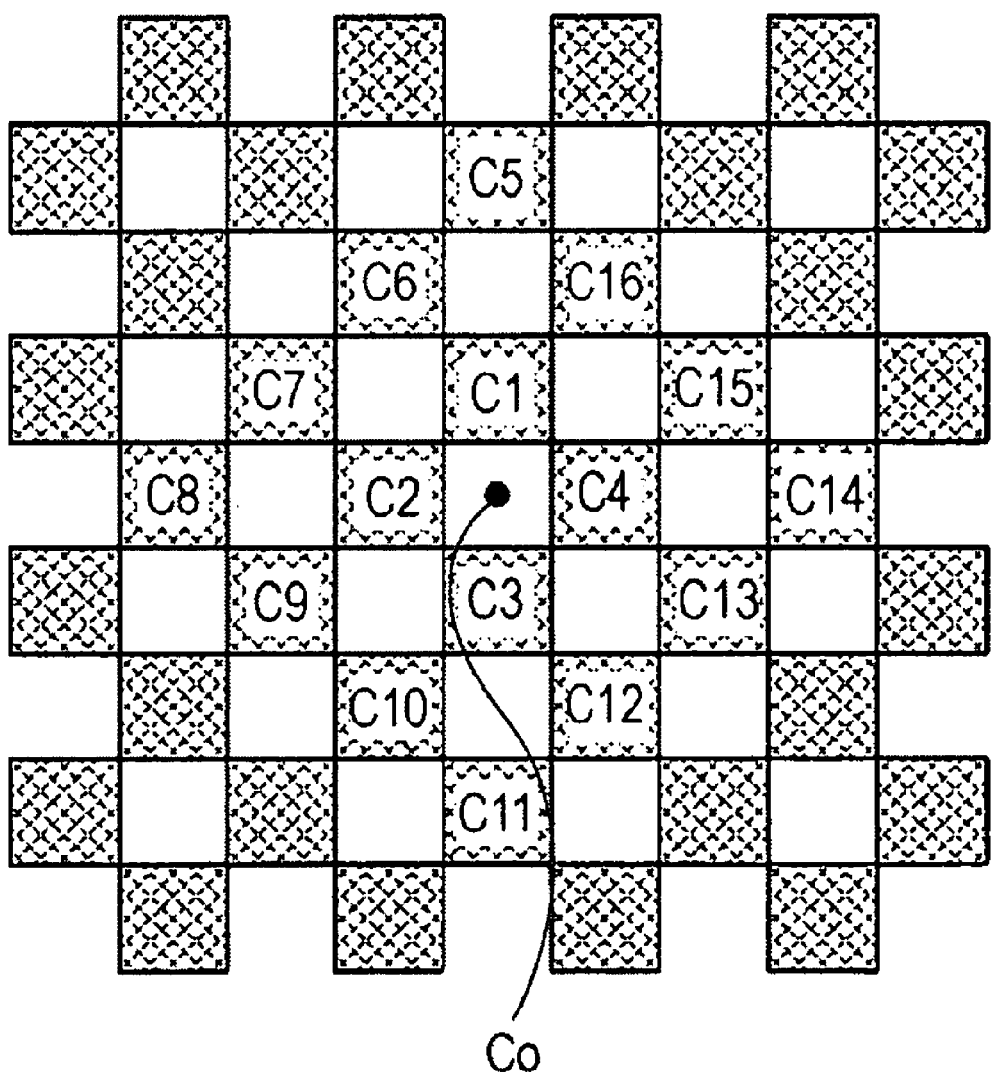
FIG. 4 is a diagram showing an interpolation process of interpolating a blank pixel with a pixel value.

First, as a blank pixel interpolation method, as shown in FIG. 4, a blank pixel $C_0$ is interpolated using neighboring pixels $C_1, C_2, \ldots, C_n$ around the blank pixel $C_0$. Here, if pixel values of the individual pixels are represented by $P(C_k)$ ($k=1, 2, \ldots, n$), the pixel value of the blank pixel $C_0$ is set using Equation (1).

$$P(C_0) = C_1(f) \times P(C_1) + C_2(f) \times P(C_2) + \ldots + Cn(f) \times P(Cn) \quad \text{Equation (1)}$$

Here, $C_1(f), C_2(f), \ldots, C_n(f)$ in Equation (1) are weighting functions to be applied to the respective neighboring pixels. Those weighting functions may be arbitrarily determined. In the following description, Interpolation Examples 1 and 2 will be described as specific examples in which a pixel value of a blank pixel is calculated based on the interpolation process shown in Equation (1).

Figure 5B:
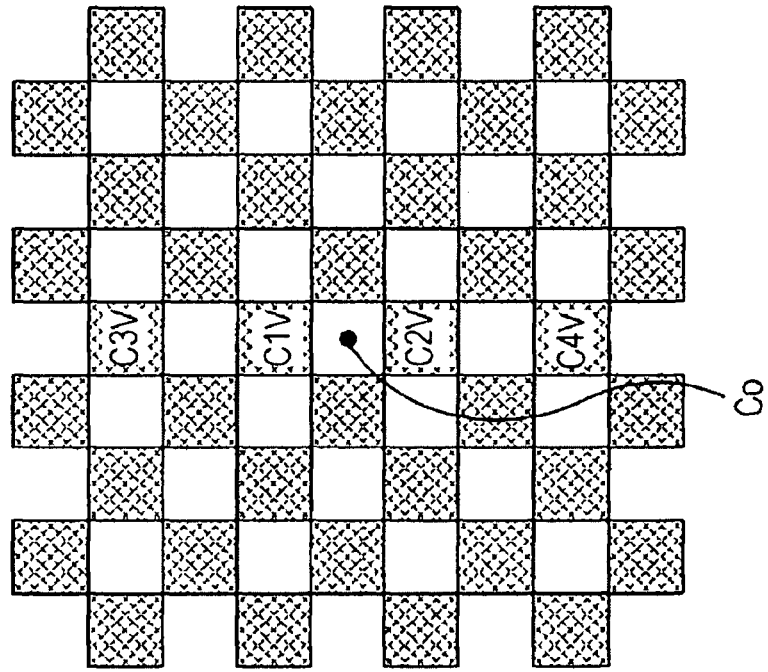
FIG. 5B is a diagram showing a vertical interpolation process.
Figure 5A:
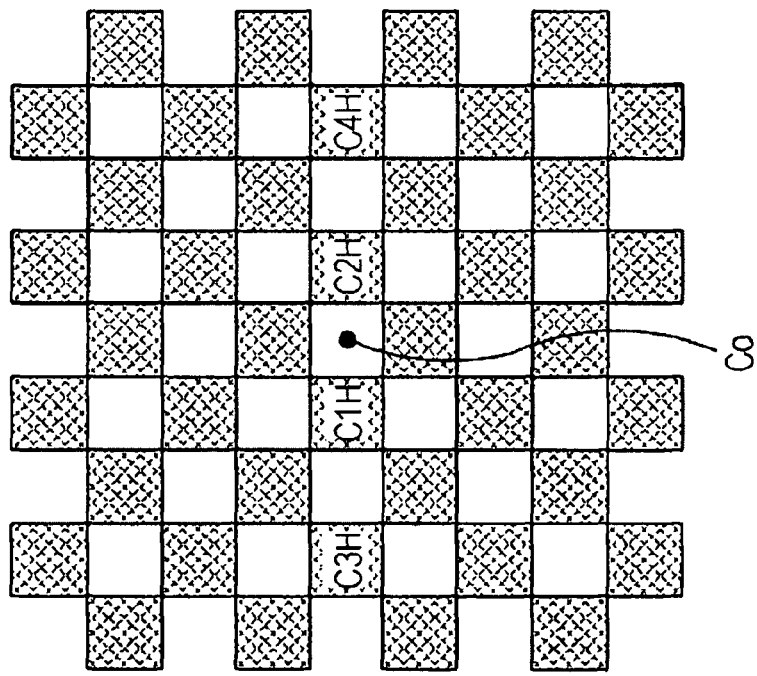
FIG. 5A is a diagram showing a horizontal interpolation process for a blank pixel.

In Interpolation Example 1, a horizontal interpolation process and a vertical interpolation process are shown as one-dimensional interpolation processes. The horizontal interpolation process is an interpolation process shown in Equation (2) in which, as shown in FIG. 5A, weighting factors $C_{1h}(f)$, $C_{2h}(f)$, $C_{3h}(f)$, and $C_{4h}(f)$ corresponding to pixels $C_{1h}$, $C_{2h}$, $C_{3h}$, and $C_{4h}$ arranged adjacent to each other on the same horizontal line as that of a blank pixel $C_0$ are set and weighting factors corresponding to the remaining pixels are set to 0.

$$P(C_0) = C_{1h}(f) \times P(C_{1h}) + C_{2h}(f) \times P(C_{2h}) + C_{3h}(f) \times P(C_{3h}) + C_{4h}(f) \times P(C_{4h}) \quad \text{Equation (2)}$$

Further, the vertical interpolation process is an interpolation process shown in Equation (3) in which, as shown in FIG.

5B, weighting functions $C_{1v}(f)$, $C_{2v}(f)$, $C_{3v}(f)$, and $C_{4v}(f)$ corresponding to pixels $C_{1v}$, $C_{2v}$, $C_{3v}$, and $C_{4v}$ arranged adjacent to each other on the same vertical line as that of a blank pixel $C_0$ are set and weighting functions corresponding to the remaining pixels are set to 0.

$$P(C_0)=C_{1v}(f) \times P(C_{1v})+C_{2v}(f) \times P(C_{2v})+C_{3v}(f) \times P(C_{3v})+C_{4v}(f) \times P(C_{4v}) \quad \text{Equation (3)}$$

Here, in a case where a vertical interpolation is to be performed, since the individual pixel values of the color signals 20R, 20G, and 20B are generally scanned and placed in the horizontal direction, a buffer that stores individual pixel values of the vertical direction is necessary. In a case where a horizontal interpolation is to be performed, on the other hand, it is not necessary to use such a buffer, and a design with reduced circuit size can be achieved compared with the vertical interpolation process.

Figure 6:
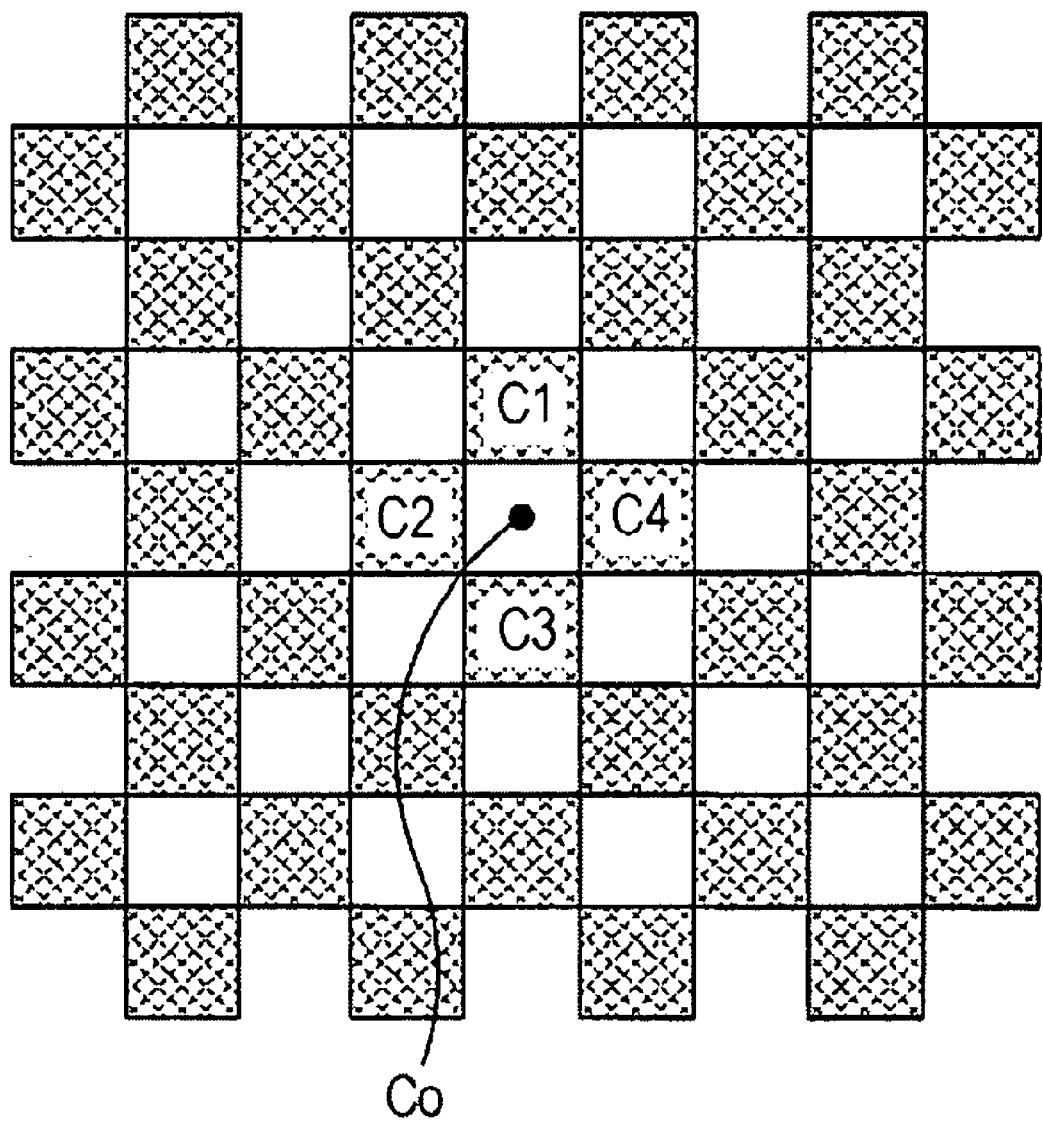
FIG. 6 is a schematic diagram showing that a two-dimensional four-pixels-weighted interpolation process is applied to a blank pixel.

Subsequently, Interpolation Example 2 will be described with reference to FIG. 6 as a specific example regarding two-dimensional interpolation. In Interpolation Example 2, as a two-dimensional interpolation, as shown in FIG. 6, a blank pixel $C_0$ is to interpolation based on the pixel values of four pixels adjacent thereto in the horizontal and vertical directions Specifically, Equation (4) in which all weighting factors $C_n(f)$ in Equation (1) above are set to 1/n is derived.

$$P(C_0)=(P(C_1)+P(C_2)+\ldots+P(C_n))/n \quad \text{Equation (4)}$$

Further, in order to perform interpolation based on the pixel values of the four adjacent pixels, "n" in Equation (4) is set to 4 and Equation (3) is derived.

$$P(C_0)=(P(C_1)+P(C_2)+P(C_3)+P(C_4))/4 \quad \text{Equation (5)}$$

As shown in Equation (5), by multiplying the four adjacent pixels by the same coefficient, the blank pixel $C_0$ can be interpolated with a pixel value obtained by averaging the pixel values of the four pixels to which the blank pixel is adjacent in the up, down, left, and right directions.

Here, as shown in Equation (5), in a case where a blank pixel is to be interpolated by averaging the pixel values of four pixels adjacent in the horizontal and vertical directions, if an edge exists near the blank pixel, the edge may be blurred. Therefore, in order to prevent an edge from being blurred, it is desirable that a correlation among adjacent pixels be determined and a weighting function be determined based on this correlation. Thus, as shown in Equation (6), individual weighting factors $C_1(f)$, $C_2(f)$, $C_3(f)$, and $C_4(f)$ are set based on a correlation value of pixels $C_1$, $C_2$, $C_3$, and $C_4$.

$$P(C_0)=C_1(f) \times P(C_1)+C_2(f) \times P(C_2)+C_3(f) \times P(C_3)+C_4(f) \times P(C_4) \quad \text{Equation (6)}$$

Figure 7:
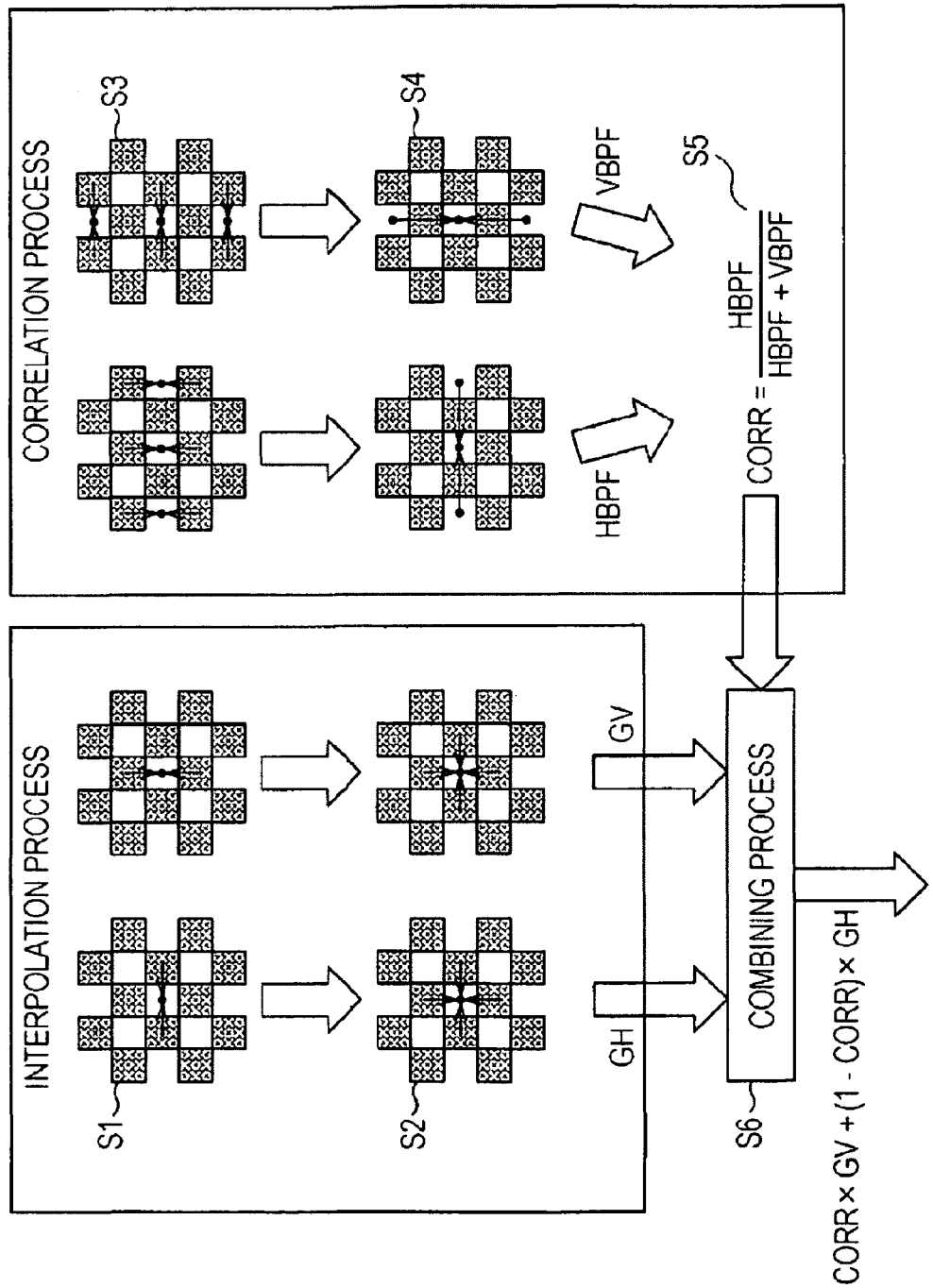
FIG. 7 is a diagram showing an interpolation process of interpolating a blank pixel on the basis of a correlation.

As in Interpolation Example 2, in a case where a blank pixel is to be interpolated by performing the one-dimensional interpolation process shown in Interpolation Example 1 described above only in the horizontal or vertical direction, an edge may also be blurred to cause degradation in image quality. Thus, a specific example in which an interpolation process is performed by taking such degradation in image quality into consideration will be described in detail with reference to FIG. 7.

An interpolation process is performed on a blank pixel $P_{(x, y)}$ from the pixel values of two pixels adjacent in each of the horizontal and vertical directions (step S1). Specifically, as shown in Interpolation Example 1, an average value of the pixel values of two pixels adjacent to a blank pixel located at desired coordinates (x, y) in a two-dimensional array in each of the horizontal direction (x direction) and vertical direction (y direction) is calculated. That is, as shown in Equations (7) and (8), a horizontally interpolated pixel value $GH_{(x, y)}$ and a vertically interpolated pixel value $GV_{(x, y)}$ are calculated, respectively.

$$GH_{(x,y)}=(P_{(x-1,y)}+P_{(x+1,y)})/2 \quad \text{Equation (7)}$$

$$GV_{(x,y)}=(P_{(x,y-1)}+P_{(x,y+1)})/2 \quad \text{Equation (8)}$$

Note that the calculated GH and GV are subjected to median filter processing in order to reduce the influence of noise (step S2).

Figure 8:
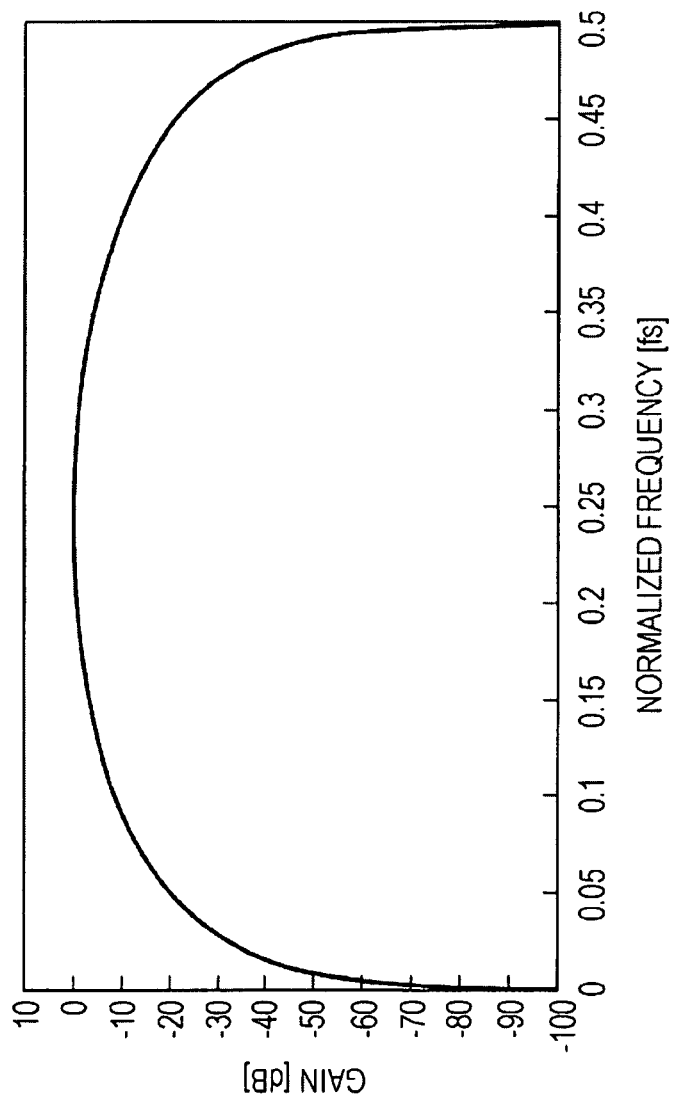
FIG. 8 is a diagram showing a characteristic of a band-pass filter that allows frequency components around ¼ [fs] to pass therethrough.

Then, a band-pass filter process is performed to determine whether or not an edge of a pixel value exists near a blank pixel. In the present specific example, a band-pass filter that detects an edge of ¼ [fs] is used. This band-pass filter allows, as shown in FIG. 8, frequency components around a frequency of ¼ [fs] to pass therethrough, and attenuates DC frequency components and frequency components around ½ [fs].

Note that a band-pass filter that allows frequency components around ¼ [fs] to pass therethrough may not necessarily be used, and instead a band-pass filter that allows a frequency component of ½ [fs] or ⅛ [fs] to pass therethrough may be used according to the purpose.

Individual band-pass filter gains $HBPF_{(x, y)}$ and $VBPF_{(x, y)}$ in the horizontal and vertical directions with respect to the blank pixel $P_{(x, y)}$ are represented by Equations (9) and (10), respectively.

$$HBPF_{(x,y)}=(-P_{(x-2,y)}+2P_{(x,y)}-P_{(x+2,y)})/4 \quad \text{Equation (9)}$$

$$VBPF_{(x,y)}=(-P_{(x,y-2)}+2P_{(x,y)}-P_{(x,y+2)})/4 \quad \text{Equation (10)}$$

Here, $P_{(x, y)}$ in Equation (9) is a blank pixel. Further, $P_{(x-2, y)}$ and $P_{(x-2, y)}$, which are displaced parallel by two pixels with respect to $P_{(x, y)}$, are also blank pixels because individual pixels are arranged in a check pattern. Thus, it is required to determine $P_{(x-2, y)}$, $P_{(x, y)}$, and $P_{(x+2, y)}$ by performing an interpolation process before the band-pass filter process shown in Equation (8) is performed.

In the present embodiment, $P_{(x-2, y)}$, $P_{(x, y)}$, and $P_{(x+2, y)}$ are set to vertically interpolated pixel values $GV_{(x-2, y)}$, $GV_{(x, y)}$, and $GV_{(x+2, y)}$ using Equation (8) above (step S3). Furthermore, $P_{(x, y-2)}$, $P_{(x, y)}$, and $P_{(x, y+2)}$ in Equation (7) are also required to be subjected to a similar interpolation process, and are set to $GH_{(x, y-2)}$, $GH_{(x, y)}$, and $GH_{(x, Y+2)}$, respectively.

Subsequently, substituting the calculated interpolated pixel values into Equations (9) and (10) yields $HBPF_{(x, y)}$ and $VBPF_{(x, y)}$, respectively (step S4). In this way, $HBPF_{(x, y)}$ and $VBPF_{(x, y)}$ serve to detect an edge of a frequency component of ¼ [fs] in the vertical and horizontal directions, respectively.

Thus, the direction of an edge existing in a blank pixel located at coordinates (x, y) is represented by a correlation value $CORR_{(x, y)}$, as shown in Equation (11), using the ratio of $HBPF_{(x, y)}$ and $VBPF_{(x, y)}$ (step S5).

$$CORR_{(x,y)}=HBPF_{(x,y)}/(HBPF_{(x,y)}+VBPF_{(x,y)}) \quad \text{Equation (11)}$$

$CORR_{(x, y)}$ denotes a correlation value in the vertical direction, and has a value varying from 0 to 1. That is, if the value of $CORR_{(x, y)}$ is large, the value of $HBPF_{(x, y)}$ is larger that that of $VBPF_{(x, y)}$, resulting in high probability that an edge is present in the vertical direction. In a case where an edge is present in the vertical direction, the pixels neighboring the blank pixel have a correlation in the vertical direction. If the value of $CORR_{(x, y)}$ is small, on the other hand, the pixels neighboring the blank pixel have a correlation in the horizontal direction.

And in the present exemplary embodiment, as shown in Equation (12), a pixel value $P(C_0)$ of $F_0$ located at coordinates (x, y) is calculated from the horizontally interpolated pixel value $GH_{(x, y)}$ and the vertically interpolated pixel value $GV_{(x, y)}$ on the basis of the correlation value $CORR_{(x, y)}$ (step S6).

$$P_{(x,y)} = CORR_{(x,y)} \times GV_{(x,y)} + (1 - CORR_{(x,y)}) \times GH_{(x,y)} \quad \text{Equation (12)}$$

For example, if the value of $CORR_{(x, y)}$ is large, the weighting factor by which $GV_{(x, y)}$ is multiplied is increased compared with that of $GH_{(x, y)}$ to interpolate the blank pixel. If the value of $CORR_{(x, y)}$ is small, on the other hand, the weighting factor by which $GH_{(x, y)}$ is multiplied is increased compared with that of $GV_{(x, y)}$ to interpolate the blank pixel.

Here, Equation (12) is equivalent to a case where an interpolation process is performed by setting the weighting factors $C_1(f)$ and $C_3(f)$ in Equation (6) shown in Interpolation Example 2 to $CORR_{(x, y)}$ and the weighting factors $C_2(f)$ and $C_4(f)$ to $(1 - CORR_{(x, y)})$.

The demosaic processing unit 220 performs roughly three processes based on the foregoing interpolation method. That is, the demosaic processing unit 220 performs, first, an interpolation process of determining interpolated pixel values $GH_{(x, y)}$ and $GV_{(x, y)}$ in the horizontal and vertical directions with respect to a blank pixel, a correlation process of determining a correlation value $CORR_{(x, y)}$ in pixels around the blank pixel, and a combined interpolation process of interpolating the blank pixel from the interpolated pixel values $GH_{(x, y)}$ and $GV_{(x, y)}$ on the basis of the correlation value $CORR_{(x, y)}$.

Furthermore, while in the interpolation process described above, the blank pixel located at the coordinates (x, y) is set to be of interest and an interpolation process therefor has been shown, it is assumed that the process is performed on all blank pixels arranged in a two-dimensional array. In this way, from a color signal having pixels arranged in a check pattern and including a plurality of blank pixels, a color signal in which the blank pixels have been interpolated can be generated.

Figure 9:
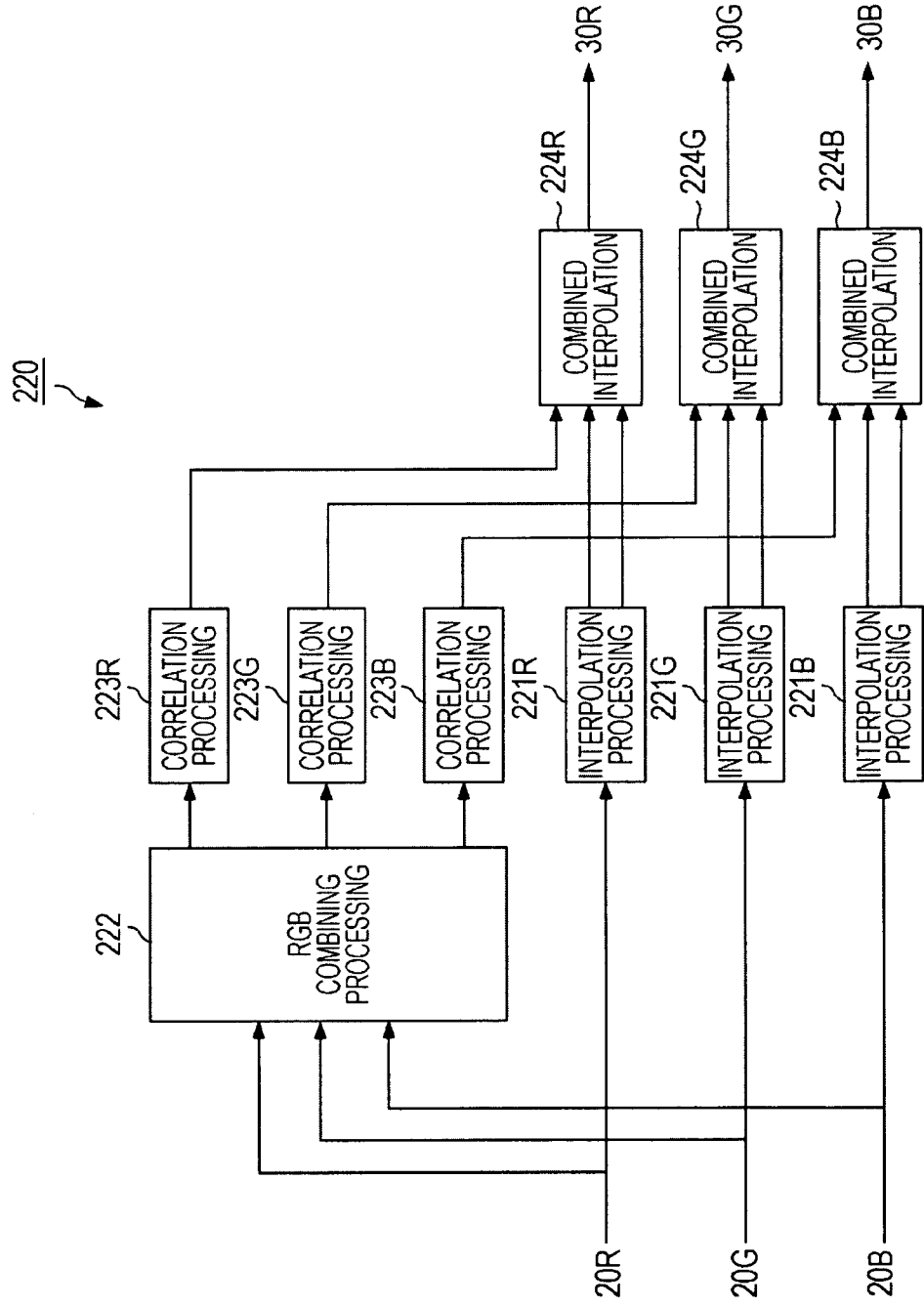
FIG. 9 is a block diagram showing a structure of a demosaic processing unit.

Here, the demosaic processing unit 220 is composed of processing blocks as shown in FIG. 9 in order to calculate the color signals 30R, 30G, and 30B from the color signals 20R, 20G, and 20B on the basis of the interpolation process described above.

That is, the demosaic processing unit 220 includes interpolation processing units 221R, 221G, and 221B, an RGB combining processing unit 222, correlation processing units 223R, 223G, and 223B, and combined interpolation processing units 224R, 224G, and 224B.

The interpolation processing unit 221R performs the interpolation process shown in Equations (7) and (8) on a blank pixel of the color signal 20R, and individually outputs a horizontally interpolated pixel value $GH_R$ and a vertically interpolated pixel value $GV_R$. Likewise, the interpolation processing unit 221G outputs a horizontally interpolated pixel value $GH_G$ and a vertically interpolated pixel value $GV_G$, and the interpolation processing unit 221B outputs a horizontally interpolated pixel value $GH_B$ and a vertically interpolated pixel value $GV_B$.

The RGB combining processing unit 222 outputs composite signals $S_R$, $S_G$, and $S_B$ as shown in Equations (13) to (15) from the color signals 20R, 20G, and 20B. The composite signals $S_R$, $S_G$, and $S_B$ are further input to the correlation processing units 223R, 223G, and 223B, respectively.

$$S_R = a_1 u_R + b_1 u_G + c_1 u_B \quad \text{Equation (13)}$$

$$S_G = a_2 u_R + b_2 u_G + c_2 u_B \quad \text{Equation (14)}$$

$$S_B = a_3 u_R + b_3 u_G + c_3 u_B \quad \text{Equation (15)}$$

Here, it is assumed that $u_R$, $u_G$ and $u_B$ shown in Equations (13) to (15) denote color signals 20R, 20G, and 20B, respectively.

The correlation processing unit 223R performs a correlation process on a blank pixel in the composite signal $S_R$ using the band-pass filter shown in Equations (9) and (10) to calculate a correlation value $CORR_R$ using Equation (11). Likewise, the correlation processing units 223G and 223B calculate correlation values $CORR_G$ and $CORR_B$, respectively.

The combined interpolation processing unit 224R substitutes the horizontally interpolated pixel value $GH_R$ and vertically interpolated pixel value $GV_R$ output from the interpolation processing unit 211R and the correlation value $CORR_R$ output from the correlation processing unit 233R into Equation (12) to interpolate the blank pixel, and outputs the color signal 30R. Likewise, the combined interpolation processing units 244G and 244B output the color signals 30G and 30B, respectively, using Equation (12).

In this way, the demosaic processing unit 220 applies the correlation process and interpolation process described above to the color signals 20R, 20G, and 20B having pixels arranged in a check pattern, and outputs the color signals 30R, 30G, and 30B in which blank pixels have been interpolated.

The digital camera 1 equipped with the demosaic processing unit 220 outputs the color signals 30R, 30G, and 30B having a higher resolution than the number of pixels of the color signals 20R, 20G, and 20B output from the imaging processing unit 100 and having no false color. Furthermore, in a case where the resolution of an image signal on the output side is fixed, in the imaging elements 130R, 130G, and 130B in the imaging processing unit 100, the amount of data to be read from photosensitive elements per given period of time becomes half that of imaging elements of the related art. Therefore, the digital camera 1 according to the present embodiment can generate a high-resolution image using an interpolation process performed by the demosaic processing unit 220 without increasing the speed of reading data from the photosensitive elements described above.

In particular, it is necessary to increase the amount of data to be read from the photosensitive elements per given period of time in order to output images having the same resolution at a high frame rate. However, there are hardware constraints to increasing a data reading speed. Despite such constraints, the digital camera 1 according to the present embodiment can generate an image having a high resolution and a high reproducibility without increasing the number of pixels of an imaging element. That is, the digital camera 1 according to the present embodiment can output a high-quality image at a high frame rate without increasing the reading speed of a photosensitive element in an imaging element, as compared with a digital camera of the related art including three-chip imaging elements.

In the demosaic processing unit 220, as described above, the composite signals $S_R$, $S_G$, and $S_B$ as shown in Equations (13) to (15) are output from the color signals 20R, 20G, and 20B. Specifically, it is required to determine the values of coefficients a, b, and c. In the following description, a structure of the demosaic processing unit 220 in which they are assigned specific coefficients will be described with respect to Specific Examples 1 and 2.

Figure 10:
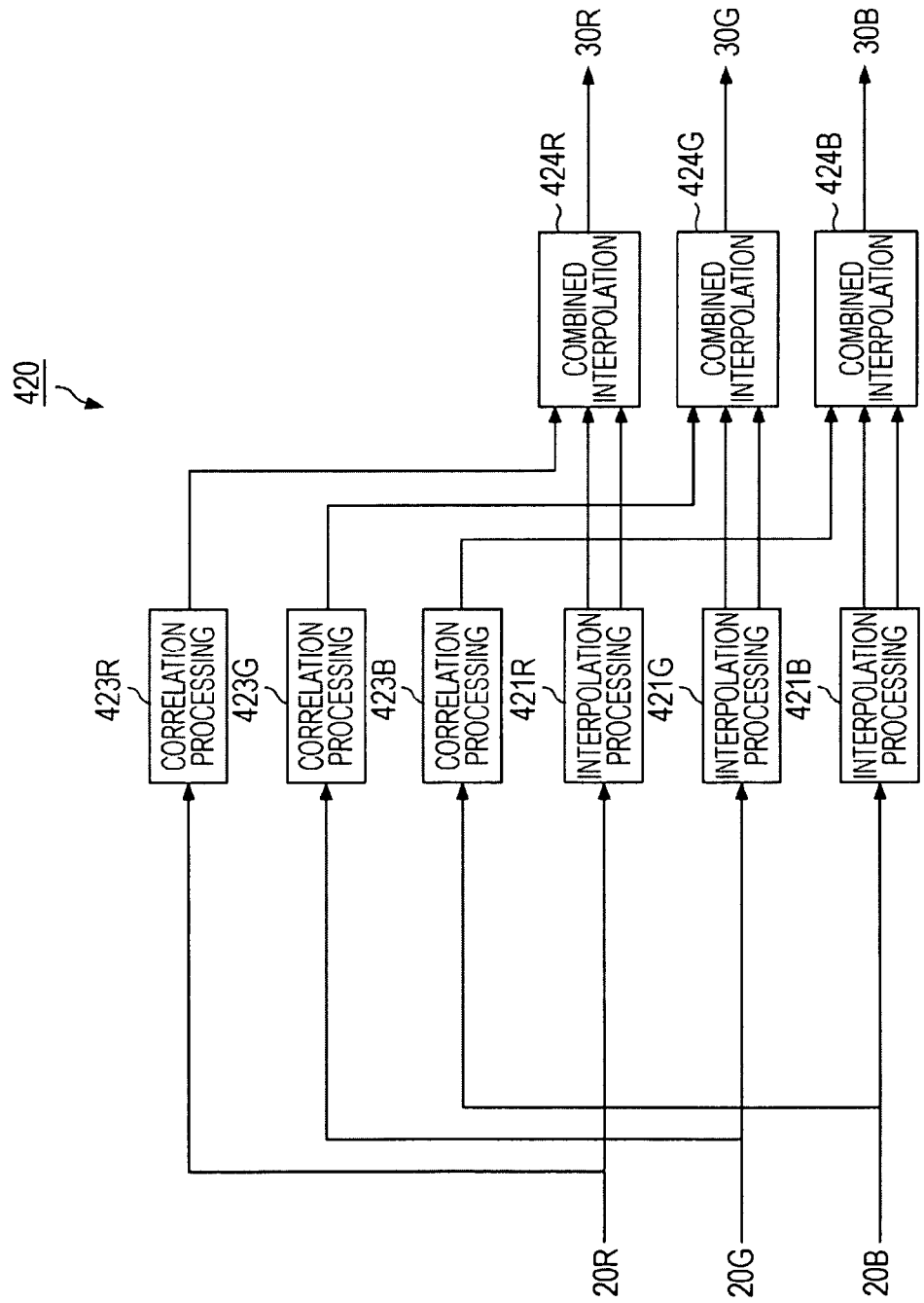
FIG. 10 is a block diagram showing a structure of a demosaic processing unit according to Specific Example 1.

As Specific Example 1, a demosaic processing unit 420 shown in FIG. 10 is configured such that among the coefficients of the RGB combining processing unit described above, $a_1$, $b_2$, and $c_3$ are set to 1 and $b_1$, $c_1$, $a_2$, $c_2$, $a_3$, and $b_3$ are set to 0. That is, the demosaic processing unit 420 shown as Specific Example 1 can be illustrated such that a processing block corresponding to an RGB combining processing unit is omitted, and performs a correlation process and an interpolation process on the color signals 20R, 20G, and 20B in an independent manner.

Figure 11:
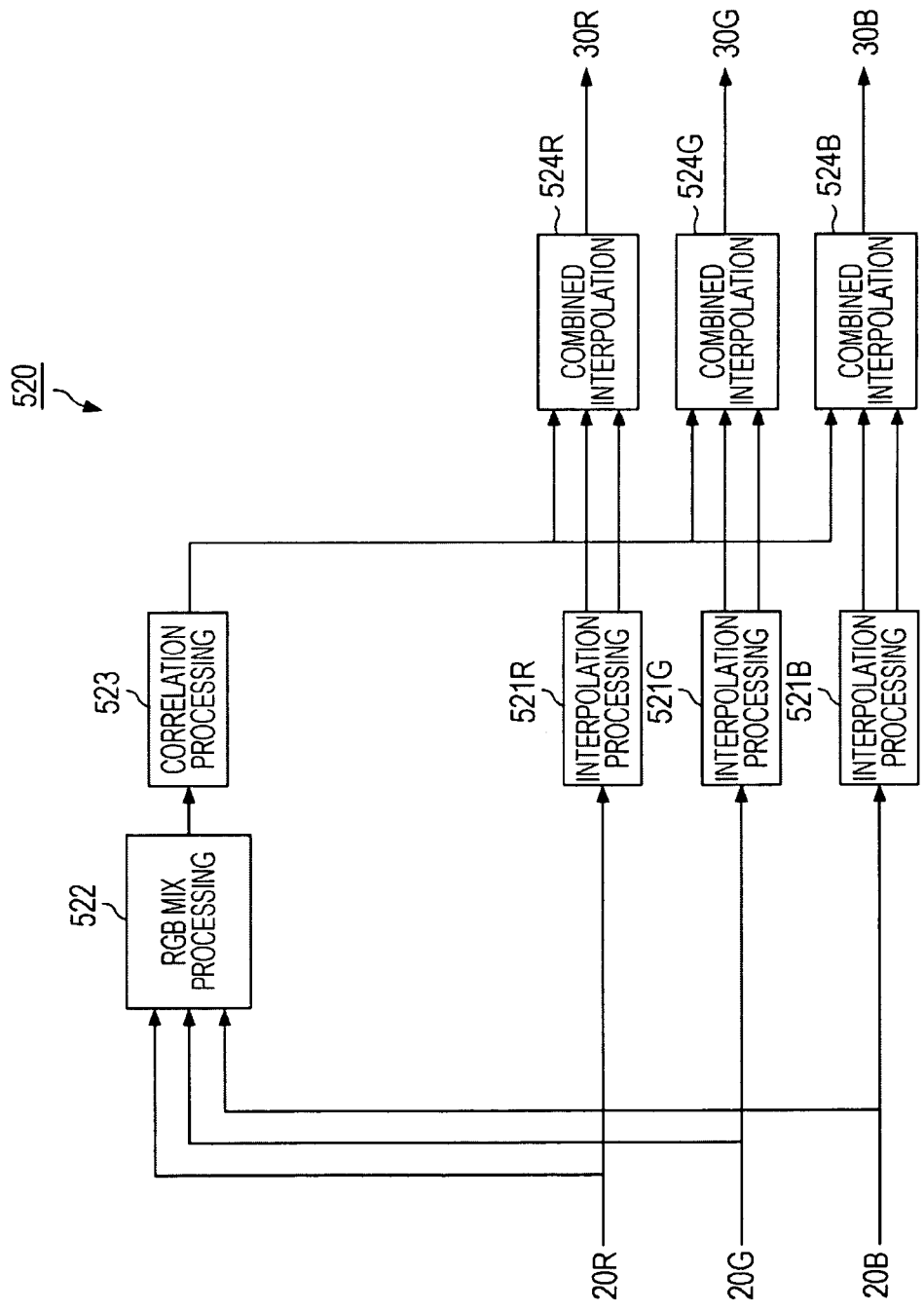
FIG. 11 is a block diagram showing a structure of a demosaic processing unit according to Specific Example 2.

Subsequently, in a demosaic processing unit 520 shown in FIG. 11 as Specific Example 2, coefficients of an RGB combining processing unit 522 are represented as $a_1=a_2=a_3=a$, $b_1=b_2=b_3=b$, and $c_1=c_2=c_3=c$. That is, the demosaic processing unit 520 of Specific Example 2 includes only one correlation processing unit 523. Here, the RGB combining processing unit 522 generates a composite signal S shown in Equation (16), and supplies the composite signal S to the correlation processing unit 522.

$$S=au_R+bu_G+cu_B \qquad \text{Equation (16)}$$

The correlation processing unit 523 determines a correlation value CORR of individual pixels to be interpolated in the composite signal S, and supplies it to combined interpolation processing units 524R, 524G, and 524B. Then, the combined interpolation processing units 524R, 524G, and 524B output color signals 30R, 30G, and 30B in which the pixels to be interpolated have been interpolated, respectively, on the basis of the same correlation value CORR.

Here, as specific values of the coefficients in Equation (16), a ratio at which a luminance signal is generated from three-primary-color signals, where a=0.3, b=0.6, and c=0.1, or a ratio which is based on a green color signal among three primary colors, where a=0, b=1, and c=0, are used.

Subsequently, the demosaic processing units 420 and 520 of Specific Examples 1 and 2 having different structures, described above, are compared in terms of three points: circuit size, noise tolerance, and image quality.

First, Specific Examples 1 and 2 are compared in terms of circuit size. As described above, the demosaic processing unit 420 of Specific Example 1 includes the three correlation processing units 423R, 423G, and 423B while the demosaic processing unit 520 of Specific Example 2 includes the single correlation processing unit 523. Here, the amount of processing of one correlation processing unit is significantly greater than the amount of processing of an interpolation processing unit corresponding to a single-color signal. Thus, the demosaic processing unit 520 of Specific Example 2 can be much smaller in circuit size involved in performing a correlation process than Specific Example 1.

Next, Specific Examples 1 and 2 are compared in terms of noise tolerance. In the digital camera 1 according to the present embodiment, the red color light 10R, the green color light 10G, and the blue color light 10B are independently converted into electrical signals using photosensitive elements of the three imaging elements 130R, 130G, and 130B, respectively. Therefore, the imaging elements 130R, 130G, and 130B generate independent noise. For instance, due to the influence of noise produced during imaging, as shown in FIG. 12, for pixels located at the same coordinates, a longitudinal edge occurs in the imaging elements 130R and 130G and a lateral edge also occurs in the imaging element 130B.

In such a case, if the color signals 20R, 20G, and 20B are independently subjected to a correlation process using the demosaic processing unit 220 of Specific Example 1, a blank pixel in the color signals 20R and 20G is interpolated on the basis of a correlation in the lateral direction while a blank pixel in the color signal 20B is interpolated on the basis of a correlation in the longitudinal direction. Thus, a false color occurs.

On other hand, since the demosaic processing unit 220 of Specific Example 2 interpolates the color signals 20R, 20G, and 20B using the same composite signal S, blank pixels are not interpolated from different directions depending on individual color signals, and no false color occurs. That is, in a case where the noise described above as shown in FIG. 12 has occurred in the imaging elements 130R, 130G, and 130B, the degradation in image quality due to the influence of noise can be suppressed in Specific Example 2 more than in Specific Example 1.

Specific Examples 1 and 2 are further compared in terms of image quality. For example, it is assumed that in pixels at the same coordinates in the imaging elements 130R, 130G, and 130B, an edge exists only for the red color light 10R. In this case, since the demosaic processing unit 420 of Specific Example 1 applies a correlation process to the color signals 20R, 20G, and 203 in an independent manner, a correlation value $CORR_R$ corresponding to the edge for only the red color light 10R described above is calculated and a blank pixel of the color signal 20R is interpolated from this correlation value $CORR_R$.

In the demosaic processing unit 520 of Specific Example 2, on the other hand, in a case where the combination ratio of the composite signal S is set to a=0.3, b=0.6, and c=0.1, the influence of the edge existing only for the red color light 10R can cause blank pixels of the color signals 20G and 20B to be interpolated. In the demosaic processing unit 520 of Specific Example 2, furthermore, in a case where the combination ratio of the composite signal S is set to a=0, b=1, and c=0, the edge existing only for the red color light 10R is taken into consideration and a blank pixel of the color signal 20R is not interpolated.

In this way, the demosaic processing unit 420 of Specific Example 1 outputs the individual color signals 30R, 30G, and 30B while also taking an edge existing only for light of a single color among three primary colors into consideration. Therefore, without influence due to the noise described above, the demosaic processing unit 420 of Specific Example 1 could output the color signals 30R, 30G, and 30B having a higher quality than those in Specific Example 2.

Accordingly, in the digital camera 1 according to the present embodiment, an imaging signal with a high resolution can be generated at a high frame rate without impairing the reproducibility.

Note that the present invention is not intended to be limited to only the embodiment described above, and it is to be understood that a variety of modifications can be made without departing from the scope of the present invention.

The invention claimed is:

1. An imaging device that senses light incident through an opening portion to generate, for each of a red color, a green color, and a blue color, an image signal having pixels arranged adjacent to each other in a two-dimensional array, characterized by comprising:
    a red color imaging element that senses the incident light to output a red color signal having pixels arranged in a check pattern;
    a green color imaging element that senses the incident light to output a green color signal having pixels arranged in a check pattern;
    a blue color imaging element that senses the incident light to output a blue color signal having pixels arranged in a check pattern;
    interpolation processing means for interpolating blank pixels between the pixels arranged in the check patterns using pixels neighboring the blank pixels,
    correlation processing means for determining correlations among the pixels neighboring the blank pixels; and
    wherein the red color imaging element, the green color imaging element, and the blue color imaging element output the red color signal, the green color signal, and the blue color signal, respectively, in which positions of the individual pixels spatially match each other, the correlation processing means determines the correlations for each of the red color signal, the green color signal, and the blue color signal on the basis of at least one type of color signal from among the red color signal, the green color signal, and the blue color signal, the correlation processing means combines the red color signal, the green color signal, and the blue color signal, and determines a correlation among pixels neighboring a blank pixel in the combined color signals, the interpolation means interpolates pixels of the blank pixels for each of the red color signal, the green color signal, and the blue color signal on the basis of the correlations for each of the red color signal, the green color signal, and the blue color signal or on the basis of the correlation in the combined color signals to generate the image signal, and each of the red color imaging element, the green color imaging element, and the blue color imaging element includes photosensitive elements disposed on a two-dimensional array in a square lattice rotated by 45° outputting the red color, green color, and blue color signals arranged in the check patterns, wherein the check patterns are characterized by a pitch distance, and a length of a side of each photosensitive element is either the pitch distance of the check patterns or the pitch distance of the check patterns multiplied by the square root of two.

2. The imaging device according to claim 1, characterized in that the correlation processing means determines, based on the red color signal, the correlation among pixels neighboring a blank pixel in the red color signal, determines, based on the green color signal, the correlation among pixels neighboring a blank pixel in the green color signal, and determines, based on the blue color signal, the correlation among pixels neighboring a blank pixel in the blue color signal.

3. A signal processing method of generating, for each of a red color, a green color, and a blue color, an image signal having pixels arranged adjacent to each other in a two-dimensional array, characterized by comprising:

outputting, using three imaging elements, a red color signal having pixels arranged in a check pattern, a green color signal having pixels arranged in a check pattern, and a blue color signal having pixels arranged in a check pattern so that positions of the individual pixels spatially match each other;

determining, for each of the red color signal, the green color signal, and the blue color signal, a correlation among pixels neighboring each of blank pixels between the individual pixels arranged in the check pattern on the basis of at least one color signal of the red color signal, the green color signal, and the blue color signal;

interpolating the blank pixels for each of the red color signal, the green color signal, and the blue color signal on the basis of the correlations to generate the imaging signal; and combining the red color signal, the green color signal, and the blue color signal, and determining a correlation among pixels neighboring a blank pixel in the combined color signals.

4. The imaging device according to claim 1, characterized in that interpolating blank pixels includes generating a horizontally interpolated pixel value and a vertically interpolated pixel value for each of the blank pixels.

5. The imaging device according to claim 1 characterized by further comprising a band-pass filter to determine whether or not an edge of a pixel value exists near one of the blank pixels.

6. The signal processing method of claim 3 characterized by further compromising:

determining, based on the red color signal, the correlation among pixels neighboring a blank pixel in the red color signal, determining, based on the green color signal, the correlation among pixels neighboring a blank pixel in the green color signal, and determining, based on the blue color signal, the correlation among pixels neighboring a blank pixel in the blue color signal.

7. An imaging device that senses light incident through an opening portion to generate, for each of a red color, a green color, and a blue color, an image signal having pixels arranged adjacent to each other in a two-dimensional array, characterized by comprising:

a red color imaging element that senses the incident light to output a red color signal having pixels arranged in a check pattern;

a green color imaging element that senses the incident light to output a green color signal having pixels arranged in a check pattern;

a blue color imaging element that senses the incident light to output a blue color signal having pixels arranged in a check pattern;

interpolation processing means for interpolating blank pixels between the pixels arranged in the check patterns using pixels neighboring the blank pixels, correlation processing means for determining correlations among the pixels neighboring the blank pixels; and wherein the red color imaging element, the green color imaging element, and the blue color imaging element output the red color signal, the green color signal, and the blue color signal, respectively, in which positions of the individual pixels spatially match each other, the correlation processing means determines the correlations for each of the red color signal, the green color signal, and the blue color signal on the basis of at least one type of color signal from among the red color signal, the green color signal, and the blue color signal, the correlation processing means combines the red color signal, the green color signal, and the blue color signal, and determines a correlation among pixels neighboring a blank pixel in the combined color signals, and the interpolation means interpolates pixels of the blank pixels for each of the red color signal, the green color signal, and the blue color signal on the basis of the correlations for each of the red color signal, the green color signal, and the blue color signal or on the basis of the correlation in the combined color signals to generate the image signal.

8. The imaging device according to claim 7, characterized in that the correlation processing means determines, based on the red color signal, the correlation among pixels neighboring a blank pixel in the red color signal, determines, based on the green color signal, the correlation among pixels neighboring a blank pixel in the green color signal, and determines, based on the blue color signal, the correlation among pixels neighboring a blank pixel in the blue color signal.

9. The imaging device according to claim 8, characterized in that interpolating blank pixels includes generating a horizontally interpolated pixel value and a vertically interpolated pixel value for each of the blank pixels.

10. The imaging device according to claim 9 characterized by further comprising a band-pass filter to determine whether or not an edge of a pixel value exists near one of the blank pixels.

11. The imaging device according to claim 9, characterized in that each of the red color imaging element, the green color imaging element, and the blue color imaging element includes photosensitive elements disposed on a two-dimensional array in which a square lattice is rotated by 45°.

* * * * *